G. H. SOCIE.
NUT LOCK.
APPLICATION FILED SEPT. 3, 1920.

1,362,270. Patented Dec. 14, 1920.

Inventor
George H. Socie
By Joshua R. H. Potts
Attorney

UNITED STATES PATENT OFFICE.

GEORGE H. SOCIE, OF ALTOONA, PENNSYLVANIA.

NUT-LOCK.

1,362,270.     Specification of Letters Patent.     Patented Dec. 14, 1920.

Application filed September 3, 1920. Serial No. 407,886.

*To all whom it may concern:*

Be it known that I, GEORGE H. SOCIE, a citizen of the United States, residing at Altoona, county of Blair, and State of Pennsylvania, have invented certain new and useful Improvements in Nut-Locks, of which the following is a specification.

My invention relates to nut locks and the object of my invention is to provide a simple device which will effectually prevent accidental unscrewing of the nut. A further object of my invention is to provide a device of the character mentioned which will automatically take up any slack between the nut and the work and which will prevent rattling of the bolt or nut. A further object of my invention to provide a device as mentioned which will at all times uniformly and equally engage the entire under surface of the nut. Further objects will appear hereinafter.

With these objects in view my invention consists generally in a washer adapted to be located between the nut and the work and provided on its under face with an inclined face in combination with a wedge member adapted to be located behind the inclined surface of the washer and equipped with means to prevent turning of the nut. My invention also consists in various details of construction and arrangements of parts all as will be fully described hereinafter and particularly pointed out in the claims.

My invention will be more readily understood by reference to the accompanying drawings forming a part of this specification and in which—

Figures 4, 5:
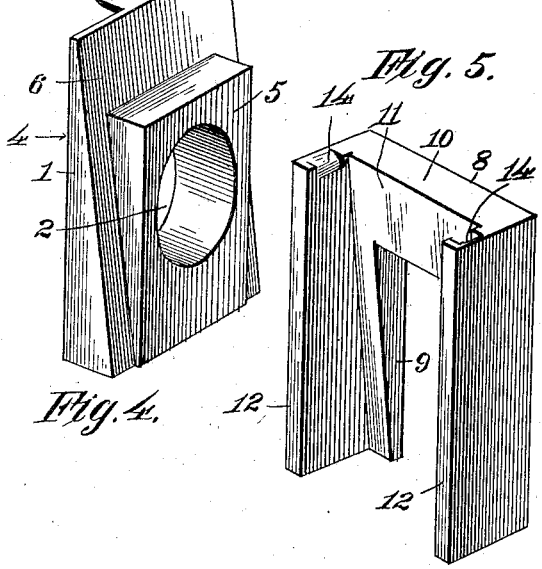
Fig. 4 is a perspective view of the washer.
Fig. 5 is a similar view of the wedge member.

Referring now to the drawings 1 indicates a washer apertured as at 2 to receive a bolt 3. The body of the washer 1 is formed with parallel outer and under faces 4 and 5 respectively and the under portion is cut away forming an inclined surface 6 upon each side and above the main body portion as clearly shown in Fig. 4. An outwardly extending lug 7 is provided at the upper end of the washer for a purpose hereinafter described.

Figure 1:
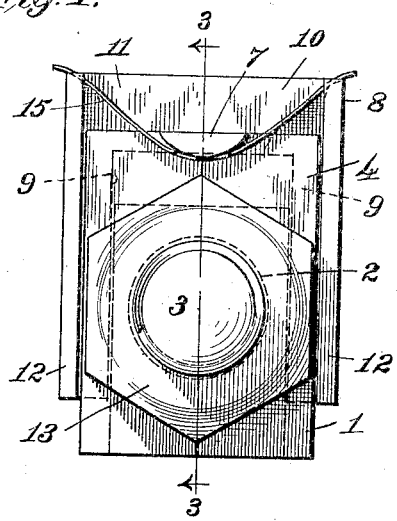
Figure 1 is a front elevation of a device embodying my invention.
Figure 2:
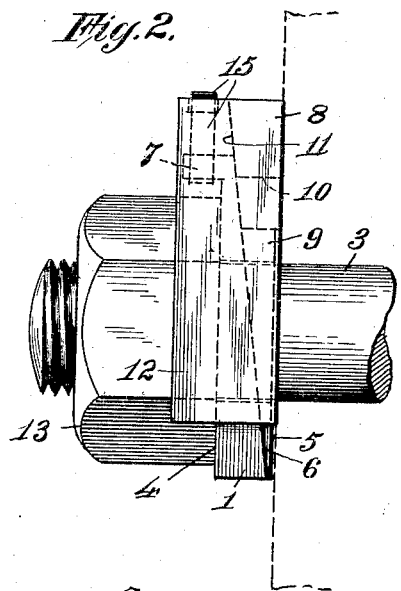
Fig. 2 is a side elevation thereof.
Figure 3:
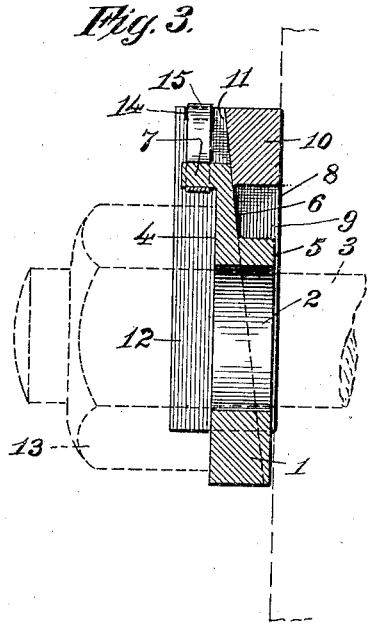
Fig. 3 is a sectional view on the line 3—3 of Fig. 1.

8 indicates the wedge member which is preferably U-shaped, comprising the lateral portions 9—9 and the transverse top portion 10. The faces 11 of the portions 9 and 10 are inclined at the same angle as the face 6 of the washer, so that when the parts are assembled as illustrated in Figs. 1 to 3, the outer faces of the two parts will lie parallel. The edges of the member 8 are formed with outwardly extending flanges 12 which, when the device is in position extend beyond the face 4 of the washer and lock the nut 13 against rotation. The upper edges of the flanges 12 are preferably provided with notches 14, and a leaf spring 15 extends across the upper edges of the flanges and is positioned under the lugs 7, thereby exerting a constant pull on the wedge 8. The notches 14 form seats for the spring and prevent accidental displacement of the same.

In using the device the washer 1 is placed over the bolt and the nut 13 is screwed into place. The wedge member is then placed into position behind the washer and if the nature of the work requires, may be driven downwardly to further tighten the bolt. The flanges 12 prevent accidental unscrewing of the nut by engaging the side faces thereof as clearly indicated in the drawings.

The spring 15 is then placed into position. It is obvious that any loosening of the bolt from any cause whatever will be automatically taken up by the member 8. This also prevents rattling of the nut. With this construction it is also obvious that equal pressure is exerted at all times to the under faces of the nut thereby preventing any distorting forces being applied thereto.

I claim:—

1. In a nut lock, a washer having an inclined face, and a wedge member adapted to engage said face and means for forcing said wedge into operative relation to said washer, substantially as described.

2. A device as set forth in claim 1 in combination with means on said wedge to prevent turning of the nut, substantially as described.

3. A nut lock comprising a washer having parallel outer and under faces, part of the under portion of the washer being cut away forming an inclined surface, and a wedge member adapted to be arranged between said inclined surface and the work, substantially as described.

4. A device as set forth in claim 3 in which said wedge member is substantially U-shaped and equipped with outwardly extending flanges projecting beyond the outer faces of the washer as and for the purpose specified.

5. A device as set forth in claim 3 in combination with a spring for forcing the wedge into operative relation with the washer, substantially as described.

6. A nut lock comprising a washer, there being an inclined face on the under side on said washer, a wedge member positioned between said inclined face and the work, outwardly extending flanges on said wedge member projecting beyond the outer faces of the washer, an outwardly extending lug on the washer and a spring resting on the top of said flanges and under said lug as and for the purpose specified.

In testimony whereof I have signed my name to this specification in the presence of two subscribing witnesses.

GEORGE H. SOCIE.

Witnesses:
C. R. CURRY,
LEO D. HOLLAND.